United States Patent
Huang et al.

(10) Patent No.: US 11,733,659 B2
(45) Date of Patent: Aug. 22, 2023

(54) INTELLECTUAL QUALITY MANAGEMENT METHOD, ELECTRONIC DEVICE AND COMPUTER READABLE STORAGE MEDIUM

(71) Applicant: Shenzhen Fulian Fugui Precision Industry Co., Ltd., Shenzhen (CN)

(72) Inventors: Yi-Hsiu Huang, New Taipei (TW); Kuang-Hung Chiang, New Taipei (TW); Ai-Jun Meng, Shenzhen (CN); Yu-Hsiang Tung, New Taipei (TW); Min-Zhi Shen, Shenzhen (CN); Shyang-Yih Wang, New Taipei (TW); Po-Chun Chang, New Taipei (TW)

(73) Assignee: Shenzhen Fullan Fugui Precision Industry Co., Ltd., Shenzhen (CN)

( * ) Notice: Subject to any disclaimer, the term of this patent is extended or adjusted under 35 U.S.C. 154(b) by 27 days.

(21) Appl. No.: 17/400,478

(22) Filed: Aug. 12, 2021

(65) Prior Publication Data
US 2022/0404778 A1 Dec. 22, 2022

(30) Foreign Application Priority Data
Jun. 21, 2021 (CN) .......................... 202110688166.7

(51) Int. Cl.
G05B 13/02 (2006.01)
G05B 23/02 (2006.01)
G06Q 50/04 (2012.01)

(52) U.S. Cl.
CPC ....... *G05B 13/0255* (2013.01); *G05B 13/022* (2013.01); *G05B 13/025* (2013.01); *G05B 23/0213* (2013.01); *G06Q 50/04* (2013.01)

(58) Field of Classification Search
CPC ........... G05B 1/00–24/00; G06Q 10/00–50/00
(Continued)

(56) References Cited

U.S. PATENT DOCUMENTS 7,006,878 B2 * 2/2006 Schweizerhof ........ G06Q 10/06
  700/109
7,006,992 B1 * 2/2006 Packwood ............. G06Q 40/03
  705/38

(Continued)

FOREIGN PATENT DOCUMENTS

CN 104750979 B 12/2017
TW 201413605 A 4/2014

OTHER PUBLICATIONS

Kostina, Marina. "Reliability management of manufacturing processes in machinery enterprises." Theses of Tallinn University of Technology. ISSN 1406-4766 71 (2012). (Year: 2012).*

(Continued)

*Primary Examiner* — Alan S Miller
(74) *Attorney, Agent, or Firm* — ScienBiziP, P.C.

(57) ABSTRACT

An intellectual quality management method is disclosed. A heatmap risk interface is created according to the required data and the parameter configuration which are calculated using a time dependent risk priority number (RPN) equation. An intellectual audit scheduling algorithm is defined via the heatmap risk interface to automatically generate at least one audit plan. An audit program corresponding to the audit plan is performed and a plurality of problem points are selected. Intellectual root cause category recommendation is performed to the questions points. intellectual corrective actions and preventive action recommendations are performed to the problem points according to the intellectual root cause category recommendation to obtain at least one optimum corrective action and at least one preventive action. Corrective actions are performed to each audit unit according to the corrective action to solve the problem points and prevention actions are performed to each audit unit according to the preventive action.

12 Claims, 8 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,412,632 | B2* | 8/2008 | Liddy | G06Q 10/10 |
| | | | | 714/57 |
| 8,260,653 | B1* | 9/2012 | Osterfelt | G06Q 10/06 |
| | | | | 705/7.36 |
| 9,430,311 | B2* | 8/2016 | Lee | G06F 11/0703 |
| 11,023,812 | B2* | 6/2021 | Sloane | G06Q 30/0202 |
| 2002/0194040 | A1* | 12/2002 | Kornfein | G06Q 10/10 |
| | | | | 705/38 |
| 2004/0128108 | A1* | 7/2004 | Cutuli | G06F 11/008 |
| | | | | 702/185 |
| 2004/0256718 | A1* | 12/2004 | Chandler | G06Q 10/10 |
| | | | | 257/704 |
| 2005/0060213 | A1* | 3/2005 | Lavu | G06Q 10/0635 |
| | | | | 705/1.1 |
| 2005/0177260 | A1* | 8/2005 | Schweizerhof | G06Q 10/06 |
| | | | | 700/32 |
| 2006/0224325 | A1* | 10/2006 | Conway | G16H 40/40 |
| | | | | 600/300 |
| 2008/0312983 | A1* | 12/2008 | Chakka | G06Q 10/0635 |
| | | | | 705/1.1 |
| 2010/0042451 | A1* | 2/2010 | Howell | G06F 11/008 |
| | | | | 714/49 |
| 2012/0254710 | A1* | 10/2012 | Flanagan | G06Q 10/0631 |
| | | | | 715/202 |
| 2014/0052494 | A1 | 2/2014 | Anne | |
| 2015/0033080 | A1* | 1/2015 | Lee | G06F 11/0766 |
| | | | | 714/39 |

OTHER PUBLICATIONS

Kumar, Sachin, Eli Dolev, and Michael Pecht. "Parameter selection for health monitoring of electronic products." Microelectronics Reliability 50.2 (2010): 161-168. (Year: 2010).*

Tinga, Tiedo, and Richard Loendersloot. "Physical model-based prognostics and health monitoring to enable predictive maintenance." Predictive Maintenance in Dynamic Systems. Springer, Cham, 2019. 313-353. (Year: 2019).*

* cited by examiner

INTELLECTUAL QUALITY MANAGEMENT METHOD, ELECTRONIC DEVICE AND COMPUTER READABLE STORAGE MEDIUM

BACKGROUND

Technical Field

The disclosure relates to quality management, and more particularly to an intellectual quality management method.

Description of Related Art

Regarding manufacturing, quality management plays an indispensable role in the production of the factory. In the period of quality control audits, audit clauses are grading and classified, and quality statuses of production lines are monitored by formulated internal special audit plans. Discovered problem points are manually uploaded to a system to record, track and think about improvement, preventive actions and follow-up improvement statuses, which forms a closed-loop corrective action (CLCA) and also controls the quality for continuously improving customer satisfaction.

Traditional audit procedures are communicated on paper, which has problems such as "integrated management without information", "low efficiency", "messy information with untimely update" and so on. It is hard for manual scheduling audit plans to quickly obtain repetitive and high-risk issues to achieve precise scheduling. In addition, there is no repetitive problem detection mechanism which results in many blind spots and is unable to improve repetitive problems in time.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
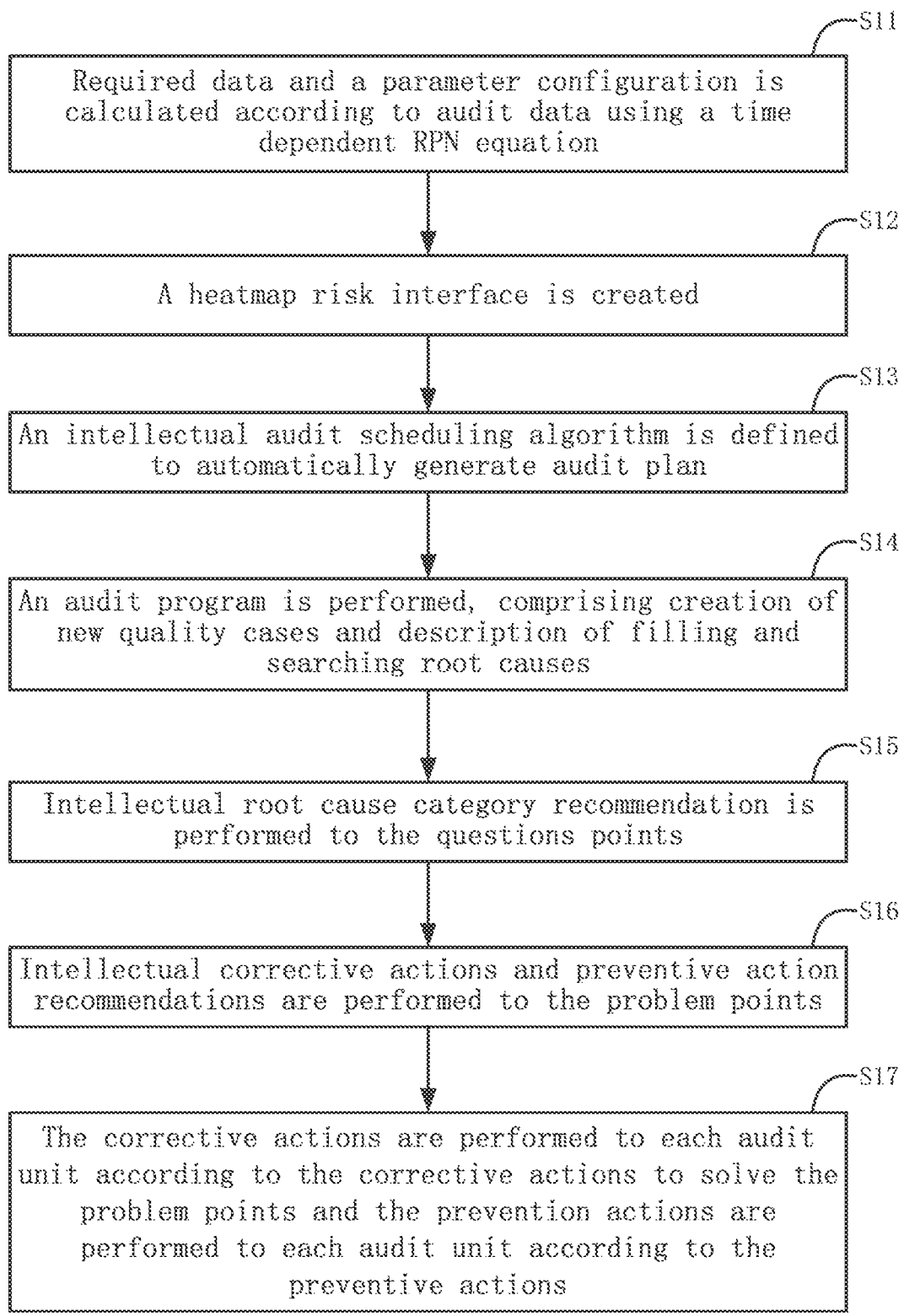
FIG. 1 is a flowchart of an embodiment of an intellectual quality management method of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

An embodiment of an intellectual quality management method includes advantages as described in the following.

(1) A heatmap risk platform for quality status is established. The quality status of a factory is calculated through a time dependent risk priority number (RPN) algorithm and is displayed using a risk heatmap. The risk heatmap is provided to managers for quickly grasping the on-site overview and striking against abnormal issues.

(2) Intellectual audit scheduling plans are defined. Based on the recent abnormal issues of the factory and the integration of regular audit projects, audit plans are automatically generated using an audit scheduling algorithm, so that every link of production can be inspected and refined.

(3) An intellectual recommendation system is created. The past quality management data is sorted and reactivated via artificial intelligence (AI) natural language processing technology, and neural network technology is then added to create an intelligent quality module. The intelligent quality module learns all the past experience of data, and also incorporates expert knowledge judgments, which can intelligently recommend suitable solutions to quality problems.

The intellectual quality management method of the embodiment of the present invention can reduce labor costs, improve management and production efficiency, effectively implement actions against the abnormal issues, and improve customer satisfaction.

FIG. 1 is a flowchart of an embodiment of an intellectual quality management method of the present disclosure. According to different needs, the order of the steps in the flowchart can be changed, and some steps can be omitted.

Establish a Heatmap Risk Platform for Quality Status

This stage comprises at least steps S11 and S12. Statistical analysis is performed on the audit data, and the risk of quality problems in the factory is recorded one by one in the system. A risk management and control interface is established according to the data of the past 7 periods and the current period to display a risk hot zone. The Heatmap risk platform can integrate the problem categories and problem details of multiple factories and corresponding time dependent RPN values and process failure mode and effects analysis (PFMEA), and displays the severity of problems through color management and the main cause of the problems via Plato charts. The Heatmap risk platform further uses labels comprising "problem type", "manufacturing division", "recurring problem" and others to integrate statistical data, so that managers can grasp all quality risk problems in the group in the shortest time.

In step S11, required data and a parameter configuration is calculated according to audit data using a time dependent risk priority number (RPN) equation. A time dependent RPN algorithm is created based on Python-Pandas, Python-Numpy and C++, and an application programming interface (API) services using Django.

Existing common RPN formulas only reflect the severity of current problems in a factory, and there is no way to detect and punish projects with high severity in the past. Therefore, in the embodiment of the present invention, the time weight is incorporated into the formula and corresponding parameters of the severity are designed according to user requirements to generate the time dependent RPN algorithm which is represented as follows:

$$RPN_{question} \square Weight1 \square Security(S) \square Occurrence(O) \square Detection(D) \square$$

$$Weight2 \square PFEMAscore(p) \square W_1 \square \square \square_{i\ k\ m} S_{i,j,k,m} \square O_{i,j,k,m} \square D_{i,j,k,m} \square W_2 \square p_j$$

wherein "Security" indicates severity, "Occurrence" indicates incidence, "Detection" indication detectability, "i" indicates quarterly, "N" indicates questions, and "k" indicates event types.

For example, in the third quarter of the FY21 fiscal year, the problem point is 4.7.1 from a look-up table, while there are two quality incidents corresponding to the problem point and the event type is Quality Incident, and m=2. In the fourth quarter of the FY21 fiscal year, the problem point is 4.7.3 from a look-up table, while there are three quality incidents corresponding to the problem point and the event type is Internal Progressive Audit, and m=3.

The time dependent RPN algorithm combines severity, incidence, detection, and PFMEA Score to form an original algorithm, which can score serious problems based on "time relationship", "problem type", "number of occurrences" and "risk" and quantify innovative indicators of all the quality risk problems.

In step S12, a heatmap risk interface is created according to the required data and the parameter configuration. A database, PostgreSQL, and front-end network application frameworks like "html", "css" and "Vue.js" are connected via an application programing interface (API) to construct the heatmap risk interface and other visualization interfaces.

Define Intellectual Audit Scheduling Plans

This stage comprises at least step S13.

In step S13, an intellectual audit scheduling algorithm is defined via the heatmap risk interface to automatically generate at least one audit plan.

The intellectual audit scheduling algorithm is defined based on heatmap quality information, customer audit specifications and innovative time dependent RPN algorithms to automatically generate audit plans.

Figure 2:
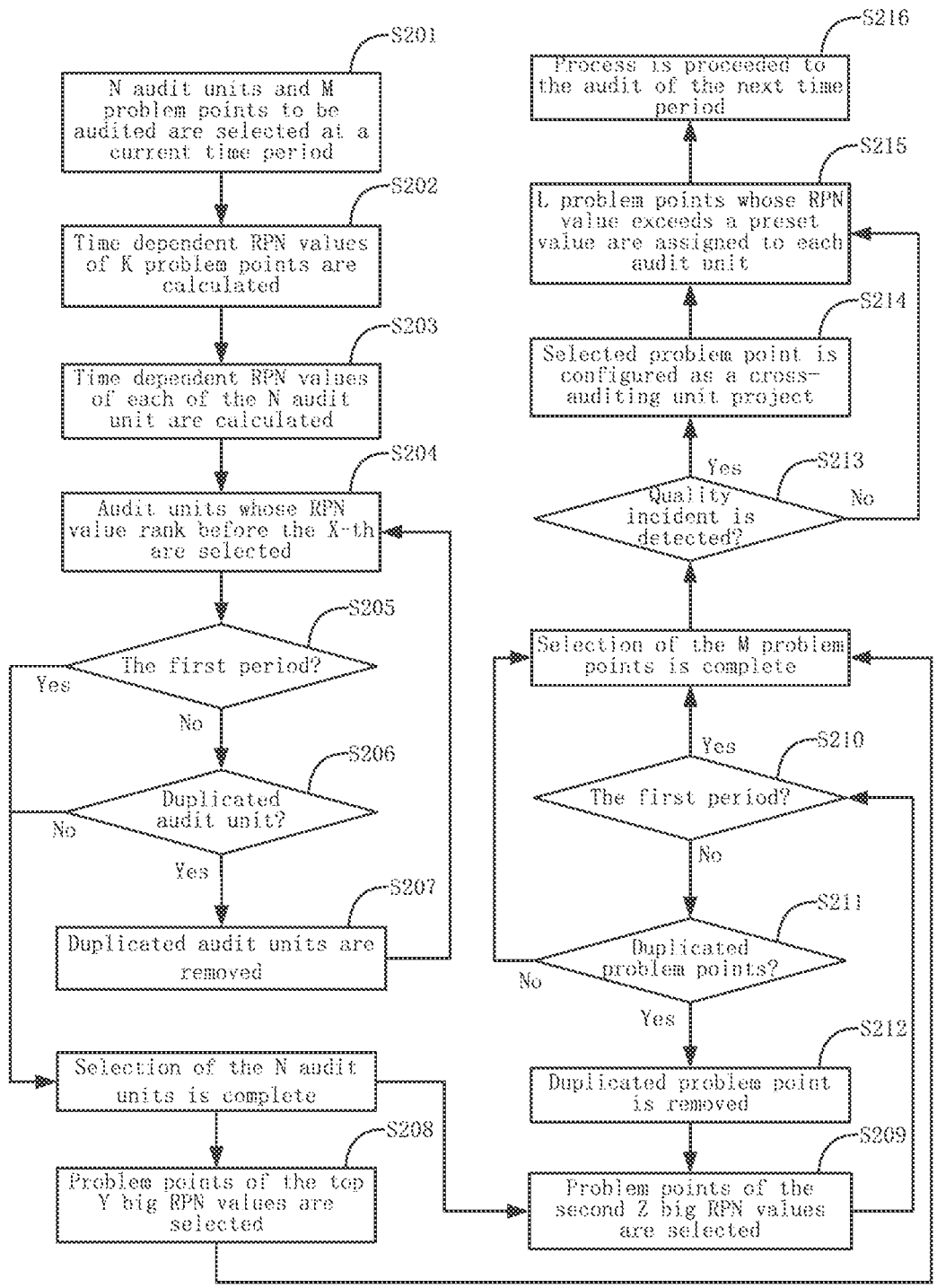
FIG. 2 is a flowchart of an embodiment of defining intellectual audit scheduling plans of the present disclosure.

FIG. 2 is a flowchart of an embodiment of defining intellectual audit scheduling plans of the present disclosure.

In step S201, N audit units and M problem points to be audited are selected at a current time period.

In step S202, time dependent RPN values of K problem points are calculated. The time period of the K questions includes the current time period plus the previous seven time periods.

In step S203, time dependent RPN values of each of the N audit unit are calculated.

In step S204, a plurality of audit units whose RPN value rank before the X-th are selected.

In step S205, it is determined whether the current time period is the first period of a circulation period.

In step S206, if the current time period is not the first period of the circulation period, it is determined whether there is any duplicated audit unit in the selected audit units.

In step S207, if there is at least one duplicated audit unit in the selected audit units, the duplicated audit unit is removed, and the process proceeds to step S204.

In the step S205, if the current time period is the first period of the circulation period or there is no duplicated audit unit, it is indicated that the selection of the N audit units is complete and the problem points of the top Y big RPN values (step S208) and the problem points of the second Z big RPN values (step S209) are selected, Y+Z=M. The problem points of the top Y big RPN values represent the most serious problem points, which doesn't matter if the problem points are repeated and weekly audits for the problem points should be scheduled. The problem points of the second Z big RPN values represent the second serious problem, and the principle for processing the problem points is not to repeat the audit in one round.

In step S210, it is determined whether the current time period is the first period of the circulation period.

In step S211, if the current time period is not the first period of the circulation period, it is determined whether there is any duplicated problem point in the selected problem points.

In step S212, if there is at least one duplicated problem point in the selected problem points, the duplicated problem point is removed, and the process proceeds to step S208.

In step S213, as the problem points of the former Y big RPN values is selected in step S208, or if the current time period is the first period of the circulation period in step S210, or if there is no duplicated problem point in step S211, it is indicated that the selection of the M problem points is complete, and it is determined whether any one of quality incident is detected within a preset time, for example, one month.

In step S214, if there is at least one quality incident is detected, the selected problem point is configured as a cross-auditing unit project.

In step S215, if there is no quality incident is detected, L problem points whose RPN value exceeds a preset value are assigned to each audit unit.

In step S216, the process proceeds the audit of the next time period.

In step S14, an audit unit is informed to check an audit time and an audit team, an audit program corresponding to the audit plan is performed, and a plurality of problem points are selected. The audit program comprises creation of new quality cases and description of filling and searching root causes.

Intellectual Recommendation Algorithm

This stage comprises at least steps S15 and S16.

In step S15, intellectual root cause category recommendation is performed to the questions points.

In step S16, intellectual corrective actions and preventive action recommendations are performed to the problem points according to the intellectual root cause category recommendation to obtain at least one optimum corrective action and at least one preventive action.

Figure 3:
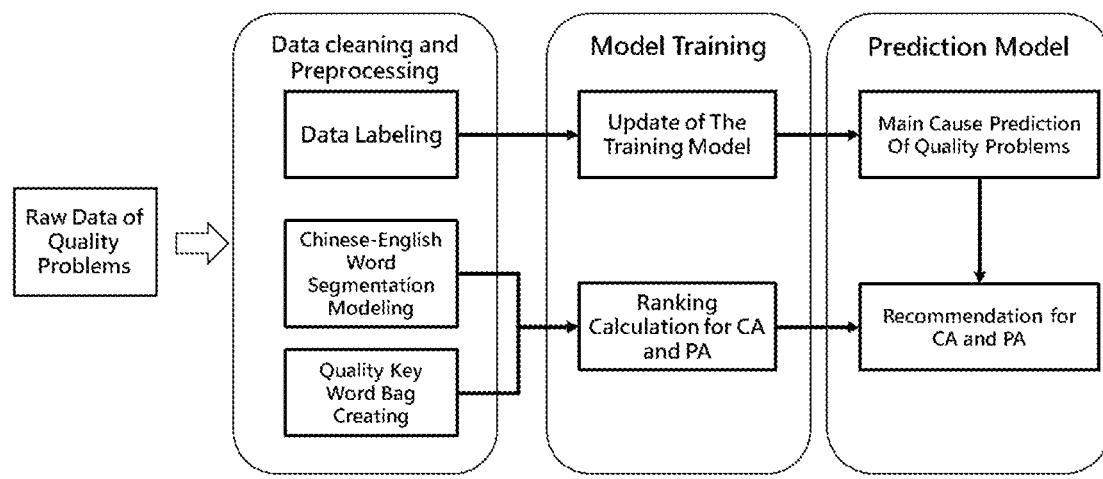
FIG. 3 is a workflow of an embodiment of an implementation process of intellectual recommendation of the present disclosure.

FIG. 3 is a workflow of an embodiment of an implementation process of intellectual recommendation of the present disclosure.

The corrective actions and preventive actions of historical audit data are stored in the form of "text description" and "Chinese-English mixed". Therefore, the method of the present disclosure Chinese-English word segmentation modeling, and quality key word bag creating The embodiment of the present invention uses the Chinese-English word segmentation modeling technology combined with a custom dictionary as the base, and then uses the word bag model combined with the text exploration algorithm to keep the training data in the best state. Further, model training and classification is performed through convolutional neural networks, deep learning algorithms and machine learning algorithms, and the best corrective actions and preventive actions are thus recommended.

Data cleaning and preprocessing is performed on raw data of the problem points, comprising data labeling, the Chinese-English word segmentation modeling, and quality key word bag creating.

Figure 4:
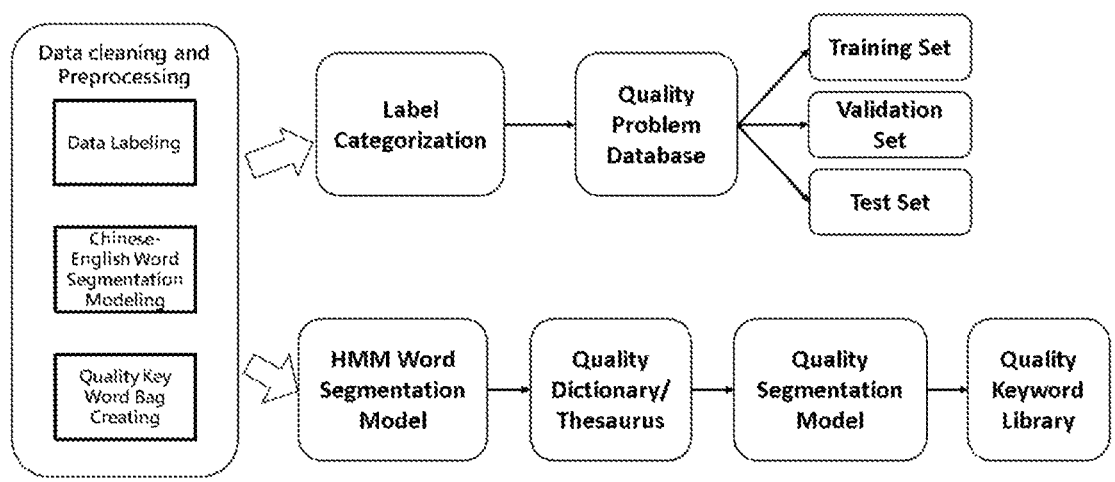
FIG. 4 is a workflow of an embodiment of an implementation process of data cleaning and preprocessing of an intellectual recommendation algorithm of the present disclosure.

FIG. 4 is a workflow of an embodiment of an implementation process of data cleaning and preprocessing of an intellectual recommendation algorithm of the present disclosure.

For the quality database of Chinese and English references, word segmentation is a very complicated problem. The embodiment of the present invention first uses Hidden Markov Model (HMM) for word segmentation, adjusts the result of the word segmentation and eliminates redundant words to establishes a unique quality dictionary. The most suitable quality Chinese-English word segmentation model is corrected based on expert knowledge. The word segmentation is performed again via the Chinese-English word segmentation model, the word segmentation results is adjusted and redundant words eliminated, and the quality word bag model is created. According to each quality problem record in the past, a standardized category is established based on problem categories, occurrence sections and problem causes. Questions are matched with corresponding labels, so that historical data can be classified into categories, and a semantic classification database is established.

Referring to update of a training model about model training in the intellectual recommendation algorithm, after experiments and tests, an embodiment of the present invention selects the convolutional neural network (CNN) model as the basis for predictive classification, and adds preprocessing and parameter adjustment training to design a variety of different parameter combinations for re-training and adjustment to improve the accuracy of model predictions.

Under the CNN architecture, the embodiment of the present invention adopts a two-layer convolutional layer with a global max pooling layer, which retains the main features while the parameters and the amount of calculation are reduced. At the same time, the fully connected layer (Dense) is used, the previously designed features are weighted and summed, and the learned "distributed feature representation" is mapped to the role of the sample label space. Further, the Sofmax function is connected to present scores of each category in a probabilistic way. A cross entropy function is used on a loss function of the model to calculate the distance between the predicted probability distribution and the probability distribution of a real answer to optimize model prediction. Function optimization adopts an improved method of gradient descent, that is, the Adam algorithm, which dynamically adjusts learning rates of each parameter according to the first-order matrix estimation and second-order matrix estimation of the gradient of each parameter according to the loss function. In addition, traditional gradient descent is improved by using momentum (moving average of parameters) and promoting dynamic adjustment of hyperparameters.

The accuracy rate of the model is further improved to 91.01% after the parameters are adjusted. Finally, the model is served as a model for predicting categories of quality problems, and is an important category basis for subsequent recommendations for the corrective actions (CA) and the preventive actions (PA).

Regarding the ranking calculation for the corrective actions (CA) and the preventive actions (PA) of the model training in the intellectual recommendation algorithm, and the intellectual recommended and preventive actions (PA) and preventive actions (PA) are the most important links in the recommendation, which can not only activate the experience of dealing with past problems, but also guide new recruits to take actions to the problems.

The importance of the ranking calculation is to find the most similar narrative to the current situation from the database of past actions and is to recommend corresponding actions. Thus, in the embodiment of the present invention, evaluation formulas for the corrective actions (CA) and the preventive actions (PA) are formulated, which reduces the weight of problems with high repetitiveness in the past and increases the weight of actions that can be effectively solved. In addition, the appraisal scores of CA and PA made by personnel are added and the sum of the two scores are combined as the score for each strategy in the history. When the CA and PA are recommended, the final recommendation is made according to this ranking score and then combined with the keyword link.

Figure 5:
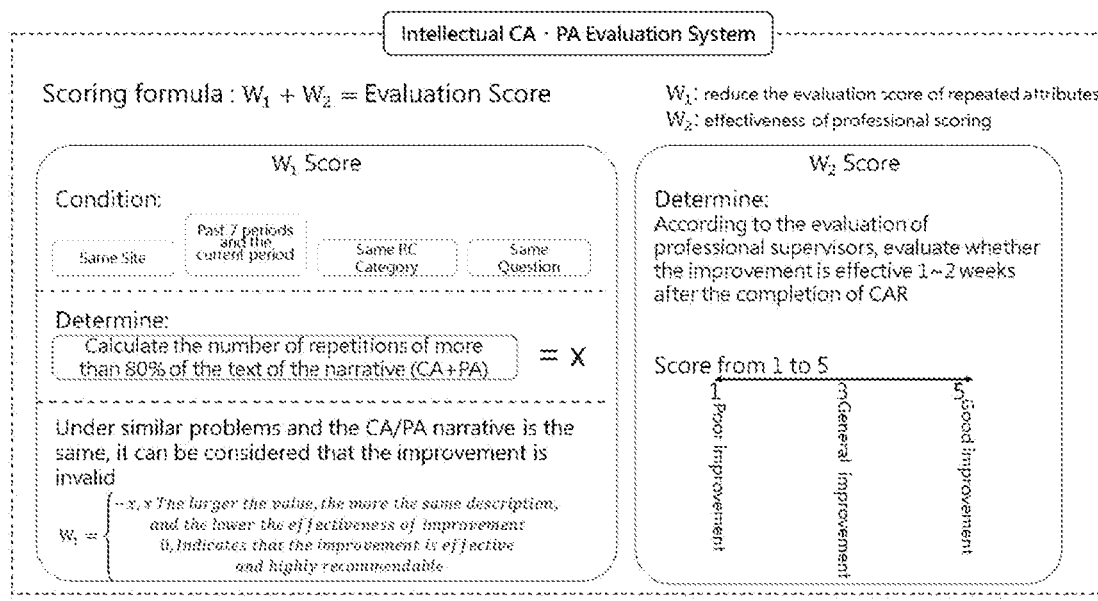
FIG. 5 is a schematic diagram of an embodiment of ranking calculation for corrective actions (CA) and preventive actions (PA) of the intellectual recommendation algorithm of the present disclosure.

FIG. 5 is a schematic diagram of an embodiment of ranking calculation for corrective actions (CA) and preventive actions (PA) of the intellectual recommendation algorithm of the present disclosure.

Regarding the prediction model in the intellectual recommendation algorithm, as the optimum corrective actions (CA) and the preventive actions (PA) are recommended, it is necessary to classify the discovered quality problems by subject first. After the categories are established, the system includes the information corresponding to the same category into judgment, performs keyword search and sentence similarity search, and puts "keywords with high matching degree" and "sentences with high similarity" in the front of the database. The ranking calculation of the evaluation scores of expert knowledge is combined for ranking within the group, and the corrective actions and the preventive actions are recommended based on the ranking scores. The corrective actions and the preventive actions are provided for users to refer to and edit sentences arbitrarily to solve the problems and serve as important recommended actions to be stored in the database that enriches the data breadth.

In step S17, the corrective actions are performed to each audit unit according to the corrective actions to solve the problem points and the prevention actions are performed to each audit unit according to the preventive actions to avoid the same problems in the future.

Figure 6:
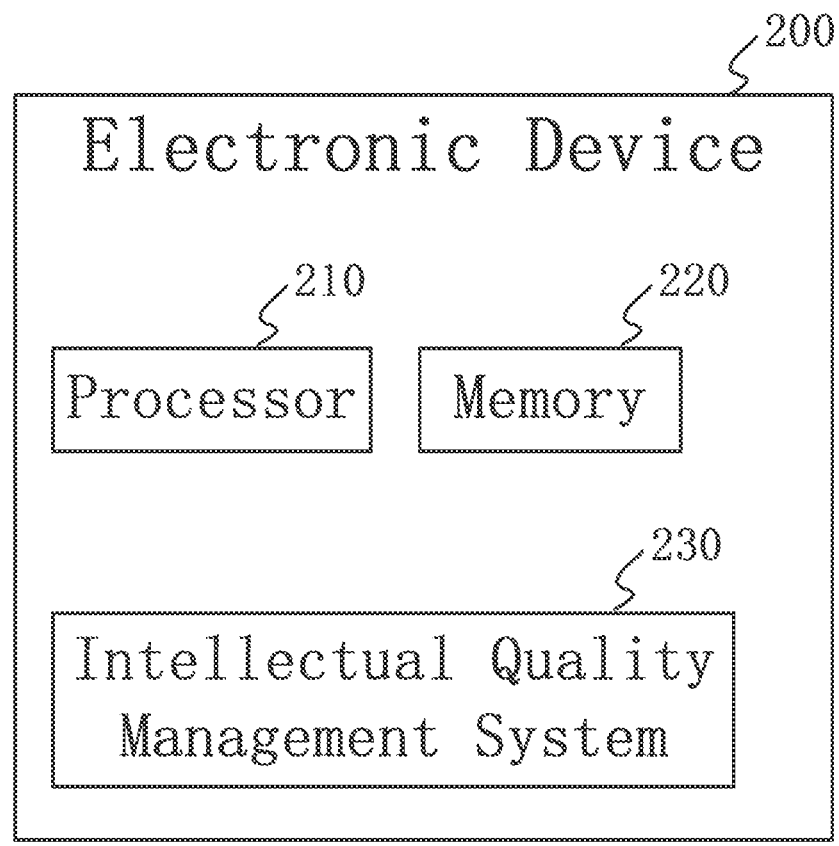
FIG. 6 is a block diagram of an embodiment of the hardware architecture of an electronic device using the method of the present disclosure.

FIG. 6 is a block diagram of an embodiment of the hardware architecture of an electronic device using the intellectual quality management method of the present disclosure. The electronic device 200 may be, but is not limited to, connected to a processor 210, a memory 220, and an intellectual quality management system 230 via system buses. The electronic device 200 shown in FIG. 6 may include more or fewer components than those illustrated, or may combine certain components.

The memory 220 stores a computer program, such as the intellectual quality management system 230, which is executable by the processor 210. When the processor 210 executes the intellectual quality management system 230, the blocks in one embodiment of the booting mode configuration method applied in the electronic device 200 are implemented, such as blocks S11 to S17 shown in FIG. 1 and blocks S201 to S216 shown in FIG. 2.

It will be understood by those skilled in the art that FIG. 6 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the intellectual quality management system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The intellectual quality management system 230 can be partitioned into one or more modules/units that are stored in the memory 220 and executed by the processor 210. The one or more modules/units may be a series of computer program instructions capable of performing particular functions of the intellectual quality management system 230.

Figure 7:
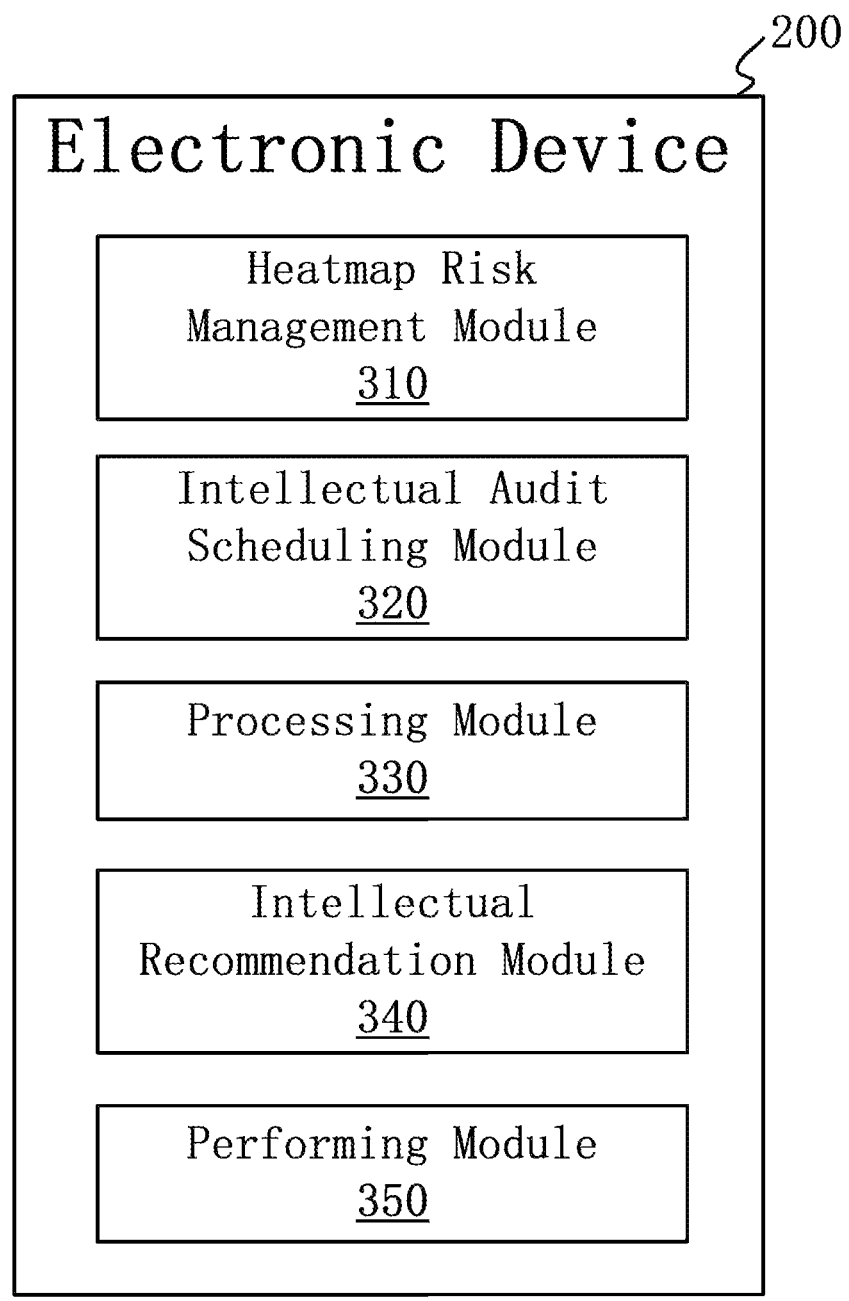
FIG. 7 is a block diagram of an embodiment of functional blocks of the electronic device using the method of the present disclosure.

FIG. 7 is a schematic diagram of an embodiment of functional blocks of the electronic device using the method of the present disclosure.

The electronic device 200 comprises a heatmap risk management module 310, an intellectual audit scheduling module 320, a processing module 330, an intellectual recommendation module 340 and a performing module 350.

The heatmap risk management module 310 is configured to calculate required data and a parameter configuration according to audit data using a time dependent RPN equation, and create a heatmap risk interface according to the required data and the parameter configuration.

The intellectual audit scheduling module 320 is configured to define an intellectual audit scheduling algorithm via the heatmap risk interface to automatically generate at least one audit plan The processing module 330 is configured to inform an audit unit to check an audit time and an audit team, perform an audit program corresponding to the audit plan, and select a plurality of problem points.

The intellectual recommendation module 340 is configured to perform intellectual root cause category recommendation to the questions points, and perform intellectual corrective actions and preventive action recommendations to the problem points according to the intellectual root cause category recommendation to obtain at least one optimum corrective action and at least one preventive action; and The performing module 350 is configured to perform corrective actions to each audit unit according to the corrective action to solve the problem points and perform prevention actions to each audit unit according to the preventive action.

Establish a Heatmap Risk Platform for Quality Status

At this stage, statistical analysis is performed on the audit data, and the risk of quality problems in the factory is recorded one by one in the system. A risk management and control interface is established according to the data of the past 7 periods and the current period to display a risk hot zone. The Heatmap risk platform can integrate the problem categories and problem details of multiple factories and corresponding time dependent RPN values and process failure mode and effects analysis (PFMEA), and displays the severity of problems through color management and the main cause of the problems via Plato charts. The Heatmap risk platform further uses labels comprising "problem type", "manufacturing division", "recurring problem" and others to integrate statistical data, so that managers can grasp all quality risk problems in the group in the shortest time.

The heatmap risk management module 310 calculates required data and a parameter configuration according to audit data using a time dependent risk priority number (RPN) equation. A time dependent RPN algorithm is created based on Python-Pandas, Python-Numpy and C++, and an application programming interface (API) services using Django.

Existing common RPN formulas only reflect the severity of current problems in a factory, and there is no way to detect and punish projects with high severity in the past. Therefore, in the embodiment of the present invention, the time weight is incorporated into the formula and corresponding parameters of the severity are designed according to user requirements to generate the time dependent RPN algorithm which is represented as follows:

$RPN_{question} \square Weight1 \square Security(S) \square Occurrence(O) \square Detection(D) \square$ $Weight2 \square PFEMAscore(p) \square W_1 \square\square\square_{i\ k\ m} S_{i,j,k,m} \square O_{i,j,k,m} \square D_{i,j,k,m} \square W_2 \square p_j$ wherein "Security" indicates severity, "Occurrence" indicates incidence, "Detection" indication detectability, "i" indicates quarterly, "N" indicates questions, and "k" indicates event types.

For example, in the third quarter of the FY21 fiscal year, the problem point is 4.7.1 from a look-up table, while there are two quality incidents corresponding to the problem point and the event type is Quality Incident, and m=2. In the fourth quarter of the FY21 fiscal year, the problem point is 4.7.3 from a look-up table, while there are three quality incidents corresponding to the problem point and the event type is Internal Progressive Audit, and m=3.

The time dependent RPN algorithm combines severity, incidence, detection, and PFMEA Score to form an original algorithm, which can score serious problems based on "time relationship", "problem type", "number of occurrences" and "risk" and quantify innovative indicators of all the quality risk problems.

The heatmap risk management module 310 creates a heatmap risk interface according to the required data and the parameter configuration. A database, PostgreSQL, and front-end network application frameworks like "html", "css" and "Vue.js" are connected via an application programing interface (API) to construct the heatmap risk interface and other visualization interfaces.

Define Intellectual Audit Scheduling Plans

The intellectual audit scheduling module 320 defines an intellectual audit scheduling algorithm via the heatmap risk interface to automatically generate at least one audit plan.

The intellectual audit scheduling algorithm is defined based on heatmap quality information, customer audit specifications and innovative time dependent RPN algorithms to automatically generate audit plans.

Figure 8:
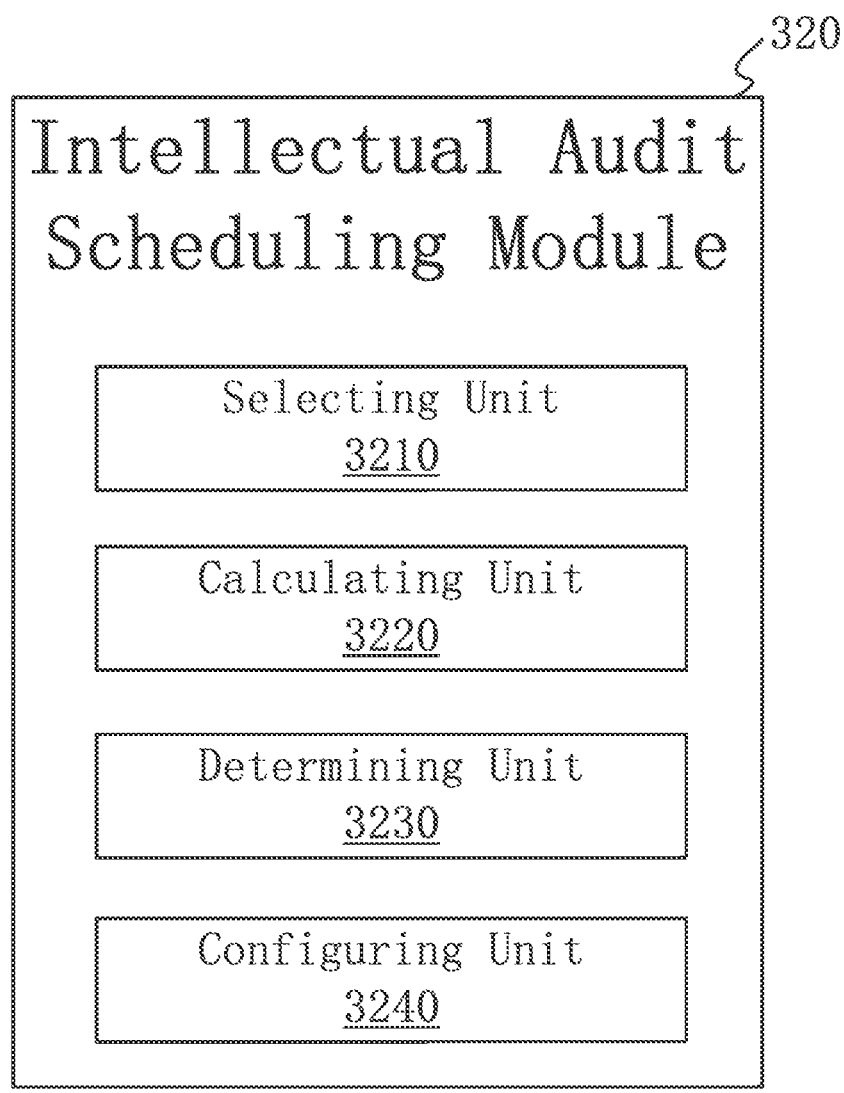
FIG. 8 is a block diagram of an embodiment of functional blocks of an intellectual audit scheduling module of the present disclosure.

FIG. 8 is a block diagram of an embodiment of functional blocks of an intellectual audit scheduling module of the present disclosure. The intellectual audit scheduling module 320 comprises a selecting unit 3210, a calculating unit 3220, a determining unit 3230 and a configuring unit 3240.

The selecting unit 3210 selects N audit units and M problem points to be audited at a current time period.

The calculating unit 3220 calculates time dependent RPN values of K problem points and calculates time dependent RPN values of each of the N audit unit. The time period of the K questions includes the current time period plus the previous seven time periods.

The selecting unit 3210 selects a plurality of audit units whose RPN value rank before the X-th.

The determining unit 3230 determines whether the current time period is the first period of a circulation period, if the current time period is not the first period of the circulation period, determines whether there is any duplicated audit unit in the selected audit units, and, if there is at least one duplicated audit unit in the selected audit units, removes the duplicated audit unit.

If the current time period is the first period of the circulation period or there is no duplicated audit unit, it is indicated that the selection of the N audit units is complete. The selecting unit 3210 selects the problem points of the top Y big RPN values (step S208) and the problem points of the second Z big RPN values (step S209), Y+Z=M. The problem points of the top Y big RPN values represent the most serious problem points, which doesn't matter if the problem points are repeated and weekly audits for the problem points should be scheduled. The problem points of the second Z big RPN values represent the second serious problem, and the principle for processing the problem points is not to repeat the audit in one round.

The determining unit 3230 determines whether the current time period is the first period of the circulation period, if the current time period is not the first period of the circulation period, determines whether there is any duplicated problem point in the selected problem points, and, if there is at least one duplicated problem point in the selected problem points, removes the duplicated problem point.

As the problem points of the former Y big RPN values is selected in step S208, or if the current time period is the first period of the circulation period in step S210, or if there is no duplicated problem point in step S211, it is indicated that the selection of the M problem points is complete. The determining unit 3230 determines whether any one of quality incident is detected within a preset time, for example, one month.

The configuring unit 3240, if there is at least one quality incident is detected, configures the selected problem point as a cross-auditing unit project, and, if there is no quality incident is detected, assigns L problem points whose RPN value exceeds a preset value to each audit unit. The process is proceeded to the audit of the next time period.

The processing module 330 informs an audit unit to check an audit time and an audit team, performs an audit program corresponding to the audit plan and selects a plurality of problem points. The audit program comprises creation of new quality cases and description of filling and searching root causes.

Intellectual Recommendation Algorithm

The intellectual recommendation module 340 performs intellectual root cause category recommendation to the questions points, and performs intellectual corrective actions and preventive action recommendations to the problem points according to the intellectual root cause category recommendation to obtain at least one optimum corrective action and at least one preventive action.

FIG. 3 is a workflow of an embodiment of an implementation process of intellectual recommendation of the present disclosure.

The corrective actions and preventive actions of historical audit data are stored in the form of "text description" and "Chinese-English mixed". Therefore, the method of the present disclosure Chinese-English word segmentation modeling, and quality key word bag creating The embodiment of the present invention uses the Chinese-English word segmentation modeling technology combined with a custom dictionary as the base, and then uses the word bag model combined with the text exploration algorithm to keep the training data in the best state. Further, model training and classification is performed through convolutional neural networks, deep learning algorithms and machine learning algorithms, and the best corrective actions and preventive actions are thus recommended.

Data cleaning and preprocessing is performed to raw data of the problem points, comprising data labeling, the Chinese-English word segmentation modeling, and quality key word bag creating.

FIG. 4 is a workflow of an embodiment of an implementation process of data cleaning and preprocessing of an intellectual recommendation algorithm of the present disclosure.

For the quality database of Chinese and English references, word segmentation is a very complicated problem. The embodiment of the present invention first uses Hidden Markov Model (HMM) for word segmentation, adjusts the result of the word segmentation and eliminates redundant words to establishes a unique quality dictionary. The most suitable quality Chinese-English word segmentation model is corrected based on expert knowledge. The word segmentation is performed again via the Chinese-English word segmentation model, the word segmentation results is adjusted and redundant words eliminated, and the quality word bag model is created. According to each quality problem record in the past, a standardized category is established based on problem categories, occurrence sections and problem causes. Questions are matched with corresponding labels, so that historical data can be classified into categories, and a semantic classification database is established.

Referring to update of a training model about model training in the intellectual recommendation algorithm, after experiments and tests, an embodiment of the present invention selects the convolutional neural network (CNN) model as the basis for predictive classification, and adds preprocessing and parameter adjustment training to design a variety of different parameter combinations for re-training and adjustment to improve accuracy of model predictions.

Under the CNN architecture, the embodiment of the present invention adopts a two-layer convolutional layer with a global max pooling layer, which retains the main features while the parameters and the amount of calculation are reduced. At the same time, the fully connected layer (Dense) is used, the previously designed features are weighted and summed, and the learned "distributed feature representation" is mapped to the role of the sample label space. Further, the Sofmax function is connected to present scores of each category in a probabilistic way. A cross entropy function is used on a loss function of the model to calculate the distance between the predicted probability distribution and the probability distribution of a real answer to optimize model prediction. Function optimization adopts an improved method of gradient descent, that is, the Adam algorithm, which dynamically adjusts learning rates of each parameter according to the first-order matrix estimation and second-order matrix estimation of the gradient of each parameter according to the loss function. In additional, traditional gradient descent is improved by using momentum (moving average of parameters) and promote dynamic adjustment of hyperparameters.

The accuracy rate of the model is further improved to 91.01% after the parameters are adjusted. Finally, the model is served as a model for predicting categories of quality problems, and is an important category basis for subsequent recommendations for the corrective actions (CA) and the preventive actions (PA).

Regarding the ranking calculation for the corrective actions (CA) and the preventive actions (PA) of the model training in the intellectual recommendation algorithm, and the intellectual recommended and preventive actions (PA) and preventive actions (PA) are the most important links in the recommendation, which can not only activate the experience of dealing with past problems, but also guide new recruits to take actions to the problems.

The importance of the ranking calculation is to find the most similar narrative to the current situation from the database of past actions and is to recommend corresponding actions. Thus, in the embodiment of the present invention, evaluation formulas for the corrective actions (CA) and the preventive actions (PA) are formulated, which reduces the weight of problems with high repetitiveness in the past and increases the weight of actions that can be effectively solved. In addition, the appraisal scores of CA and PA made by personnel are added and the sum of the two scores are combined as the score for each strategy in the history. When the CA and PA are recommended, the final recommendation is made according to this ranking score and then combined with the keyword link.

FIG. 5 is a schematic diagram of an embodiment of ranking calculation for corrective actions (CA) and preventive actions (PA) of the intellectual recommendation algorithm of the present disclosure.

Regarding the prediction model in the intellectual recommendation algorithm, as the optimum corrective actions (CA) and the preventive actions (PA) are recommended, it is necessary to classify the discovered quality problems by subject first. After the categories are established, the system includes the information corresponding to the same category into judgment, performs keyword search and sentence similarity search, and puts "keywords with high matching degree" and "sentences with high similarity" in in the front of the database. The ranking calculation of the evaluation scores of expert knowledge is combined for ranking within the group, and the corrective actions and the preventive actions are recommended based on the ranking scores. The corrective actions and the preventive actions are provided for users to refer to and edit sentences arbitrarily to solve the problems and serve as important recommended actions to be stored in the database that enriches the data breadth.

The performing module 350 performs the corrective actions to each audit unit according to the corrective actions to solve the problem points and performs the prevention actions to each audit unit according to the preventive actions to avoid the same problems in the future.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An intellectual quality management method executable by an electronic device, comprising:
   calculating required data and a parameter configuration according to audit data using a time dependent risk priority number (RPN) equation;
   creating a heatmap risk interface according to the required data and the parameter configuration;
   defining an intellectual audit scheduling algorithm via the heatmap risk interface to automatically generate at least one audit plan;
   informing an audit unit to check an audit time and an audit team and performing an audit program corresponding to the audit plan and selecting a plurality of problem points;
   performing intellectual root cause category recommendation to the questions points;
   performing data cleaning and preprocessing, model training and prediction model creation to raw data of the problem points, wherein the cleaning and preprocessing comprises data labeling, Chinese-English word segmentation modeling, and quality key word bag creating, the model training comprises training model updating and ranking calculation for corrective actions (CA) and preventive actions (PA), and the prediction model creation comprises main cause prediction of quality problems and recommendation of improvable and preventive actions;
   performing intellectual corrective actions and preventive action recommendations to the problem points according to the intellectual root cause category recommendation to obtain at least one optimum corrective action and at least one preventive action; and
   performing corrective actions to each audit unit according to the corrective action to solve the problem points and performing prevention actions to each audit unit according to the preventive action.

2. The method of claim 1, the step of defining the intellectual audit scheduling algorithm via the heatmap risk interface to automatically generate the audit plan further comprises:
   selecting N audit units and M problem points to be audited at a current time period;
   calculating time dependent RPN values of K problem points;

calculating time dependent RPN values of each of the N audit unit;

selecting a plurality of audit units whose RPN value rank before the X-th;

determining whether the current time period is the first period of a circulation period;

if the current time period is not the first period of the circulation period, determining whether there is any duplicated audit unit in the selected audit units;

if there is at least one duplicated audit unit in the selected audit units, removing the duplicated audit unit;

if the current time period is the first period of the circulation period or there is no duplicated audit unit, indicating that the selection of the N audit units is complete and selecting the problem points of the former Y big RPN values and the problem points of the second Z big RPN values, wherein Y+Z=M;

determining whether the current time period is the first period of the circulation period;

if the current time period is not the first period of a circulation period, determining whether there is any duplicated problem point in the selected problem points;

if there is at least one duplicated problem point in the selected problem points, removing the duplicated problem point;

as the problem points of the former Y big RPN values is selected, or if the current time period is the first period of the circulation period, or if there is no duplicated problem point, indicating that the selection of the M problem points is complete and determining whether any one of quality incident is detected within a preset time;

if there is at least one quality incident is detected, configuring the selected problem points as multiple cross-auditing unit projects;

if there is no quality incident is detected, assigning L problem points whose RPN value exceeds a preset value to each audit unit; and proceeding to the audit of the next time period.

3. The method of claim 1, wherein the audit program comprises creation of new quality cases and description of filling and searching root causes.

4. The method of claim 1, wherein the time dependent RPN equation is represented as:

$$RPN_{question} = \\ Weight1 \times Security(S) \times Occurrence(O) \times Detection(D) + Weight2 \times \\ PFEMAscore(p) = W_1 \sum_i \sum_k \sum_m S_{i,j,k,m} \times O_{i,j,k,m} \times D_{i,j,k,m} + W_2 \times p_j,$$

wherein "Security" indicates severity, "Occurrence" indicates incidence, "Detection" indication detectability, "i" indicates quarterly, "N" indicates questions, and "k" indicates event types.

5. The method of claim 1, further comprising:

connecting a database, PostgreSQL, and front-end network application frameworks like html, css and Vue.js via an application programing interface (API) to construct the heatmap risk interface.

6. The method of claim 1, wherein the ranking calculation for the corrective actions and the preventive actions further comprises:

discovering the most similar narrative to the current situation from the database relative to past actions implementation and recommending a corresponding actions;

wherein an evaluation score of the ranking calculation for the corrective actions and the preventive actions is W1+W2, W1 refers to reduce the evaluation score of repeated attributes, while W2 refers to effectiveness of professional scoring.

7. A non-transitory computer-readable storage medium storing game program which causes a computer to execute:

a process of calculating required data and a parameter configuration according to audit data using a time dependent risk priority number (RPN) equation;

a process of creating a heatmap risk interface according to the required data and the parameter configuration;

a process of defining an intellectual audit scheduling algorithm via the heatmap risk interface to automatically generate at least one audit plan;

a process of informing an audit unit to check an audit time and an audit team and performing an audit program corresponding to the audit plan and selecting a plurality of problem points;

a process of performing intellectual root cause category recommendation to the questions points;

a process of performing data cleaning and preprocessing, model training and prediction model creation to raw data of the problem points, wherein the cleaning and preprocessing comprises data labeling, Chinese-English word segmentation modeling, and quality key word bag creating, the model training comprises training model updating and ranking calculation for corrective actions (CA) and preventive actions (PA), and the prediction model creation comprises main cause prediction of quality problems and recommendation of improvable and preventive actions;

a process of performing intellectual corrective actions and preventive action recommendations to the problem points according to the intellectual root cause category recommendation to obtain at least one optimum corrective action and at least one preventive action; and a process of performing corrective actions to each audit unit according to the corrective action to solve the problem points and performing prevention actions to each audit unit according to the preventive action.

8. The non-transitory computer-readable storage medium of claim 7, wherein the process of defining the intellectual audit scheduling algorithm via the heatmap risk interface to automatically generate the audit plan further comprises:

a process of selecting N audit units and M problem points to be audited at a current time period;

a process of calculating time dependent RPN values of K problem points;

a process of calculating time dependent RPN values of each of the N audit unit;

a process of selecting a plurality of audit units whose RPN value rank before the X-th;

a process of determining whether the current time period is the first period of a circulation period;

a process of, if the current time period is not the first period of the circulation period, determining whether there is any duplicated audit unit in the selected audit units;

a process of, if there is at least one duplicated audit unit in the selected audit units, removing the duplicated audit unit;

a process of, if the current time period is the first period of the circulation period or there is no duplicated audit unit, indicating that the selection of the N audit units is complete and selecting the problem points of the former Y big RPN values and the problem points of the second Z big RPN values, wherein Y+Z=M;

a process of determining whether the current time period is the first period of the circulation period;

a process of, if the current time period is not the first period of a circulation period, determining whether there is any duplicated problem point in the selected problem points;

a process of, if there is at least one duplicated problem point in the selected problem points, removing the duplicated problem point;

a process of, as the problem points of the former Y big RPN values is selected, or if the current time period is the first period of the circulation period, or if there is no duplicated problem point, indicating that the selection of the M problem points is complete and determining whether any one of quality incident is detected within a preset time;

a process of, if there is at least one quality incident is detected, configuring the selected problem points as multiple cross-auditing unit projects;

a process of, if there is no quality incident is detected, assigning L problem points whose RPN value exceeds a preset value to each audit unit; and a process of proceeding to the audit of the next time period.

9. The non-transitory computer-readable storage medium of claim 7, wherein the audit program comprises creation of new quality cases and description of filling and searching root causes.

10. The non-transitory computer-readable storage medium of claim 7, wherein the time dependent RPN equation is represented as:

$$RPN_{question} = \text{Weight1} \times \text{Security}(S) \times \text{Occurence}(O) \times \text{Detection}(D) + \text{Weight2} \times PFEMAscore(p) = W_1 \sum_1 \sum_k \sum_m S_{i,j,k,m} \times O_{i,j,k,m} \times D_{i,j,k,m} + W_2 \times p_j,$$

wherein "Security" indicates severity, "Occurrence" indicates incidence, "Detection" indication detectability, "i" indicates quarterly, "N" indicates questions, and "k" indicates event types.

11. The non-transitory computer-readable storage medium of claim 7, further comprising:
a process of connecting a database, PostgreSQL, and front-end network application frameworks like html, css and Vue.js via an application programing interface (API) to construct the heatmap risk interface.

12. The non-transitory computer-readable storage medium of claim 7, the process of ranking calculation for the corrective actions and the preventive actions further comprises:
a process of discovering the most similar narrative to the current situation from the database relative to past actions implementation and recommending a corresponding actions;
wherein an evaluation score of the ranking calculation for the corrective actions and the preventive actions is W1+W2, W1 refers to reduce the evaluation score of repeated attributes, while W2 refers to effectiveness of professional scoring.

* * * * *